3,219,607
AQUEOUS DISPERSIONS OF VINYL CHLORIDE-ACRYLIC ESTER COPOLYMERS EMULSIFIED WITH SULFONATED PHENOL ALDEHYDE CONDENSATES
Jean Perronin, Chantilly, France, assignor, by mesne assignments, to Etablissements Kuhlmann, Paris, France, a corporation of France
No Drawing. Filed Aug. 4, 1961, Ser. No. 129,223
Claims priority, application France, Feb. 21, 1961, 853,360
5 Claims. (Cl. 260—29.3)

The binders used for dyeing or printing by means of pigments are often based on synthetic latexes. The latter are generally dispersions of polymers or copolymers the polymerisation of which has been carried out in emulsion in an aqueous phase. They can be incorporated in emulsions of the oil-in-water or water-in-oil types, possibly together with other resins soluble either in the aqueous phase or in the oil phase, to give binders with a viscosity more or less high according to the application for which they are intended. By application of these binders, mixed with dispersions of pigments, to any supporting material which may be, for example, fabric, paper, leather, metal, wood or plastic material, coloured effects can be obtained which have good fastness to washing and to rubbing.

In textile applications, in particular, the dyeing of fabrics may be carried out by means of a foulard and printing by means of a roller or a frame machine. In this kind of application, the stability of the suspension of polymers or copolymers is not always sufficient to prevent the re-agglomeration of the particles among themselves. Mechanical frictional phenomena are produced, on the one hand between the rollers of the foulard in the case of dyeing, and on the other hand between the end of the doctor and the roller or between the end of the doctor and the frame in the case of printing. These phenomena tend to bring together the resin particles and thus to make up agglomerates which cause pitting in the case of dyeing or uneven application in the case of printing.

An object of the present invention is the preparation of synthetic latexes having a high stability with regard to these mechanical frictional phenomena.

According to the present invention therefore a method of preparing these latexes is provided which comprises copolymerising acrylic esters with vinyl chloride in aqueous emulsion and in the presence, of a catalyst comprising a redox system and, of a sulphonated condensate of a phenolic derivative with an aldehyde.

The invention also includes the novel dispersions.

Among the acrylic esters capable of being employed to carry out the invention are, for example, methyl acrylate, ethyl acrylate and n-butyl acrylate.

The redox systems used comprise essentially an oxidising agent such as for example hydrogen peroxide or a per-salt, for example a persulphate or perborate, and a reducing agent such as for example a ferrous salt; it is often advantageous to add to them a sequestering agent such as an alkali metal pyrophosphate. The use of such an activating system is necessitated by the presence of the sulphonated phenolic derivatives, the role of which will be explained later, and which behave as inhibitors for the same reason as hydroquinone. The usual polymerisation catalysts, such as the persulphates or perborates, used alone, are not active enough in this case to start off the polymerisation.

The sulphonated condensates of the phenolic derivatives with the aldehydes may be obtained, for example, by condensing sulphonated phenolic derivatives with aldehydes, by a sulphonating condensation of phenolic derivates with aldehydes, by condensing phenolic derivatives with aldehydes and subsequent sulphonation, by condensing phenolic derivatives with aldehydes and subsequent treatment by means of alkali metal sulphites, or by a combination of these methods. For such condensations there may be employed, for example, the process of United States Patent No. 2,320,678.

The following are examples of compounds of this type:

The condensate of 3 moles of phenolsulphonic acid with 2 moles of formaldehyde

The condensate of one mole of 2-naphthol-6-sulphonic acid and one mole of a cresol with one mole of formaldehyde The condensate of 3 moles of phenol with 2 moles of formaldehyde, sulphonated after condensation The condensate of 2 moles of 4,4'-dihydrodroxy-diphenylmethane with 3 moles of formaldehyde and 2 moles of sodium sulphite The condensate of 2 moles of 4,4'-dihydroxy-diphenyl-sulphone with 3 moles of formaldehyde and 2 moles of sodium sulphite The condensate of 2 moles of 4,4''-dihydroxy-2,2-diphenyl-propane with 3 moles of formaldehyde and 2 moles of sodium sulphite, and The condensate of 3 moles of 4,4'-dihydroxy-diphenyl-sulphone with 4 moles of formaldehyde and 2 moles of sodium sulphite.

These condensates may or may not be neutralised by alkaline agents. They may be used in amounts varying from 0.5 to 5% by weight with respect to the aqueous dispersion of the copolymer. These products have at the same time the properties of protective colloids, dispersing agents and surface-active agents. It appears that their stabilising action on the emulsions may be due to the fact that they are adsorbed at the surface of the particles of copolymers at the moment when they are formed.

For the copolymerisation in emulsion according to the invention, in addition to the ingredients defined above, other auxiliary products may be added, such as for example other anionic surface-active agents, non-ionic surface-active agents, other protective colloids, other dispersing agents, anti-foaming agents, or other polymerisation catalysts.

The dispersions of the present invention can be used not only in dyeing or printing but also in finishes and, more generally, in all industries where synthetic resin emulsions are used, such as the leather, paper and paint industries.

According to the novel process of this invention copolymers in the form of aqueous dispersions are obtained. From such dispersions it is possible to prepare binders for dyeing or printing with pigments which have great mechanical stability, particularly with respect to frictional movement between two surfaces.

The following examples, in which the parts indicated are parts by weight, illustrate the invention without limiting it.

*Example 1*

40.500 parts of ethyl acrylate and 27.000 parts of vinyl chloride are copolymerised with stirring in an autoclave at a temperature of 50° C. to 80° C., in the presence of 3.750 parts of ammonium lauryl sulphate, 2.775 parts of a condensate from one mole of oleyl alcohol with 20 moles of ethylene oxide, 2.250 parts of a methylsulphited condensate from 3 moles of 4,4'-dihydroxy-diphenyl-sulphone with 4 moles of formaldehyde, 0.225 part of potassium persulphate, 0.012 part of potassium pyrophosphate trihydrate, 0.009 part of ferrous sulphate heptahydrate, and 73.500 parts of water.

150 parts of a 45% aqueous dispersion of a 40/60 vinyl chloride/ethyl acrylate copolymer are thus obtained.

This dispersion may be used in the following manner:

The 150 parts obtained above are mixed with 30 parts of a 50% urea-formaldehyde precondensate and 80 parts of water. 600 parts of heavy petrol of boiling point between 140° C. and 220° C. are emulsified in this mixture, by means of a high-speed stirrer, in the presence of 20 parts of a condensate from one mole of oleyl alcohol and 20 moles of ethylene oxide. A homogeneous paste is formed into which are introduced with stirring 100 parts of a 25% aqueous dispersion of lampblack as well as 20 parts of a 50% aqueous solution of ammonium nitrate. A dye for printing textiles is obtained which, on a printing machine with rollers working at a speed of 20 to 60 metres per minute, does not give rise to any uneven deposition of colour by production of copolymer agglomerates under the doctor of the machine. After drying and condensation for 5 minutes at 140° C., the prints on fabrics display good fastness to washing, rubbing and light.

Example 2

47.250 parts of ethyl acrylate and 20.250 parts of vinyl chloride are copolymerised with stirring in an autoclave at a temperature of 50° C. to 80° C., in the presence of 3.750 parts of ammonium lauryl sulphate, 2.775 parts of a condensate from one mole of oleyl alcohol and 20 moles of ethylene oxide, 1.125 parts of a condensate of 2-naphthol-6-sulphonic acid with p-cresol, formaldehyde and sodium sulphite, 0.225 part of potassium persulphate, 0.012 part of potassium pyrophosphate trihydrate, 0.009 part of ferrous sulphate heptahydrate and 74.625 parts of water.

150 parts of a 45% aqueous dispersion of a 30/70 vinyl chloride-ethyl acrylate copolymer are thus obtained.

This dispersion may be used in the following manner:

The 150 parts obtained above are diluted with 80 parts of water, and 700 parts of an oil phase comprising white spirit are introduced into this mixture in the presence of 20 parts of a condensate of one mole of oleyl alcohol with 20 moles of ethylene oxide, while stirring vigorously until an oil-in-water emulsion is obtained. 50 parts of a 30% aqueous dispersion of a copper phthalocyanine pigment are mixed with stirring with 950 parts of this binder emulsion. The printing paste thus obtained is able to print easily on a frame without the dispersion of the copolymer becoming re-agglomerated on the way from the doctor and thus stopping up the gauze of the frame.

The printed fabric, after drying for 5 minutes at 100° C., displays patterns of great brightness and good fastness to rubbing and washing.

After use in the printing of a paste prepared by the process of the invention, the frames can be very easily washed with a jet of cold water.

Example 3

37 parts of ethyl acrylate and 30.5 parts of vinyl chloride are copolymerised with stirring in an autoclave at 50° C. to 80° C., in the presence of 3.750 parts of ammonium lauryl sulphate, 2.775 parts of a condensate from one mole of oleyl alcohol and 20 moles of ethylene oxide, 1.125 parts of a methylsulphited condensate of 2 moles of 4',4''-dihydroxy-2,2-diphenyl-propane and 3 moles of formaldehyde, 0.225 part of potassium persulphate, 0.012 part of potassium pyrophosphate trihydrate, 0.009 part of ferrous sulphate heptahydrate and 74.625 parts of water.

The dispersion thus obtained may be used in the following way:

It is diluted with 800 parts of water and 50 parts of a 30% aqueous dispersion of a yellow azo pigment obtained by coupling the diazo compound of m-nitro-p-toluidine with acetoacetylaniline are added with stirring.

A hydrophilic fabric may be dyed on the foulard by means of such a bath, with a good evenness without any pitting being produced due to the re-agglomeration of the copolymer during the passage in the foulard. The fabric dyed by the process according to the invention, after drying at between 80° C. and 100° C., has excellent fastness to washing.

Example 4

40.500 parts of ethyl acrylate and 27.000 parts of vinyl chloride are copolymerised with stirring in an autoclave at a temperature of 50° C., to 80° C., in the presence of 3.750 parts of ammonium lauryl sulphate, 2.250 parts of a methylsulphited condensate from 3 moles of 4,4'-dihydroxy-diphenyl-sulphone and 4 moles of formaldehyde, 0.225 part of potassium persulphate, 0.012 part of potassium pyrophosphate trihydrate, 0.009 part of ferrous sulphate heptahydrate and 78.275 parts of water.

50 parts of a 50% urea-formaldehyde precondensate, 750 parts of water, and 100 parts of a 50% aqueous dispersion of a brown iron oxide pigment are added to the dispersion thus obtained.

A hydrophilic fabric is dyed on the foulard with the above mixture by the process described in Example 3. No unevennesses of colour are produced.

After drying at 80° C. and condensation for 5 minutes at 140° C., the dyed fabric has an excellent fastness to severe washing and to weather.

I claim:

1. Process for the preparation of a synthetic latex having a high stability with regard to mechanical frictional phenomena, which comprises emulsifying vinyl chloride and an acrylic ester of an alcohol containing 1 to 4 carbon atoms with water in an autoclave by means of 0.5 to 5% of a sulphonated condensate being a member of the group consisting of the condensation products of the sulphonated phenols with formaldehyde, the condensation products of the sulphonated naphthols with formaldehyde, the condensation products of the sulphonated naphthols with formaldehyde and phenols, the condensation products of the phenols with formaldehyde and the alkali metal sulphites, the condensation products of the phenol-sulphones with formaldehyde and the alkali metal sulphites, and initiating the copolymerization by means of a water soluble redox system consisting of a ferrous salt and a member of the group consisting of hydrogen peroxide and a persalt.

2. Process for the preparation of a synthetic latex having a high stability with regard to mechanical frictional phenomena, which comprises emulsifying vinyl chloride and an acrylic ester of an alcohol containing 1 to 4 carbon atoms with water in an autoclave by means of 0.5 to 5% of a sulphonated condensate being a member of the group consisting of the condensation products of the sulphonated phenols with formaldehyde, the condensation products of the sulphonated naphthols with formaldehyde, the condensation products of the sulphonated naphthols with formaldehyde and phenols, the condensation products of the phenols with formaldehyde and the alkali metal sulphites, the condensation products of the phenol-sulphones with formaldehyde and the alkali metal sulphites, and initiating copolymerization by means of a water soluble redox system consisting of a ferrous salt and a persulphate.

3. Process for the preparation of a synthetic latex having a high stability with regard to mechanical frictional phenomena, which comprises emulsifying vinyl chloride and an acrylic ester of an alcohol containing 1 to 4 carbon atoms with water in an autoclave by means of 0.5 to 5% of a sulphonated condensate being a member of the group consisting of the condensation products of the sulphonated phenols with formaldehyde, the condensation products of the sulphonated naphthols with formaldehyde, the condensation products of the sulphonated naphthols with formaldehyde and phenols, the condensation products of the phenols with formaldehyde and the alkali metal sulphites, the condensation products of the phenol-sulphones with formaldehyde and the alkali metal sulphites, initiating copolymerization by means of a water soluble redox system consisting of a ferrous salt and a persulphate, and in the presence of a sequestering agent.

4. The process of claim 3 wherein the sequestering agent is potassium pyrophosphate trihydrate.

5. A synthetic latex made by the process of claim 1.

References Cited by the Examiner

UNITED STATES PATENTS

| 2,320,678 | 6/1943 | Tassel | 260—49 |
| 2,454,543 | 11/1948 | Bock et al. | 260—49 |
| 2,564,291 | 8/1951 | Wolf | 260—29.3 |
| 2,902,459 | 9/1951 | Teppema | 260—2.3 |

OTHER REFERENCES

Bailar, John C. Jr.: "Sequestering Agents," in Encylopedia of Chemistry, ed. by Clark, N.Y. Reinhold, 1957, p. 853, QD 5 C46 C. 2.

MURRAY TILLMAN, *Primary Examiner.*

WILLIAM H. SHORT, *Examiner.*